United States Patent
Chamarthy et al.

(10) Patent No.: US 12,339,928 B2
(45) Date of Patent: Jun. 24, 2025

(54) DECREASING ERROR IN A MACHINE LEARNING MODEL BASED ON IDENTIFYING REFERENCE AND MONITORED GROUPS OF THE MACHINE LEARNING MODEL

(71) Applicant: International Business Machines Corporation, Armonk, NY (US)

(72) Inventors: Ravi Chandra Chamarthy, Hyderabad (IN); Manish Anand Bhide, Hyderabad (IN); Madhavi Katari, Hyderabad (IN); Arunkumar Kalpathi Suryanarayanan, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 1225 days.

(21) Appl. No.: 16/953,587

(22) Filed: Nov. 20, 2020

(65) Prior Publication Data
US 2022/0164606 A1 May 26, 2022

(51) Int. Cl.
*G06N 20/00* (2019.01)
*G06F 11/30* (2006.01)
*G06F 18/21* (2023.01)

(52) U.S. Cl.
CPC .......... *G06F 18/217* (2023.01); *G06F 11/302* (2013.01); *G06N 20/00* (2019.01)

(58) Field of Classification Search
CPC ..... G06F 18/217; G06F 11/302; G06N 20/00; G06N 3/08
USPC .......................................................... 706/12
See application file for complete search history.

(56) References Cited

U.S. PATENT DOCUMENTS

| | | | |
|---|---|---|---|
| 2009/0228412 A1* | 9/2009 | Matsumoto .......... | G06V 10/764 382/199 |
| 2020/0058383 A1* | 2/2020 | Birnbaum .............. | G16H 10/20 |
| 2020/0134493 A1 | 4/2020 | Bhide et al. | |
| 2020/0380309 A1* | 12/2020 | Weider ................ | G06F 18/2178 |

OTHER PUBLICATIONS

Bhide, Manish, "Bias Detection in IBM Watson OpenScale", https://medium.com/trusted-ai/bias-detection-in-IBM-watson-openscale-6f37f055a1aa, Apr. 12, 2019, 4 pages.

(Continued)

*Primary Examiner* — Hope C Sheffield
(74) *Attorney, Agent, or Firm* — Harrity & Harrity, LLP

(57) ABSTRACT

A machine learning model data quality improvement detection tool is provided for identifying an accurate reference group and an accurate monitored group of a machine learning model. The tool monitors a behavior of the machine learning model for a predetermined time frame. The tool compares a determined fairness metric a pre-defined fairness threshold. Responsive to the fairness metric failing to meet the pre-defined fairness threshold, the tool modifies the monitored group to include a first portion of the reference group. The tool compares a newly determined fairness metric to the pre-defined fairness threshold. Responsive to the newly determined fairness metric meeting the pre-defined fairness threshold, the tool identifies the modified monitored group including the first portion of the user-defined reference group as a new monitored group and the modified reference group without the first portion of the user-defined reference group as a new reference group.

20 Claims, 5 Drawing Sheets

(56) References Cited

OTHER PUBLICATIONS

Cabrera, Angel A. et al., "Discovery of Intersectional Bias in Machine Learning Using Automatic Subgroup Generation", Presented at ICLR 2019 Debugging Machine Learning Models Workshop, May 9, 2019, 6 pages.

IBM, "De-biasing options", IBM Cloud: https://cloud.ibm.com/docs/ai-openscale?topic=ai-openscale-it-dbo, Jun. 1, 2020, 5 pages.

IBM, "Fairness metrics overview", IBM Cloud: https://cloud.ibm.com/docs/ai-openscale?topic=ai-openscale-anlz_metrics_fairness, Jun. 1, 2020, 11 pages.

Mehrabi, Ninareh et al., "A Survey on Bias and Fairness in Machine Learning", https://arxiv.org/pdf/1908.09635.pdf, Sep. 17, 2019, 31 pages.

\* cited by examiner

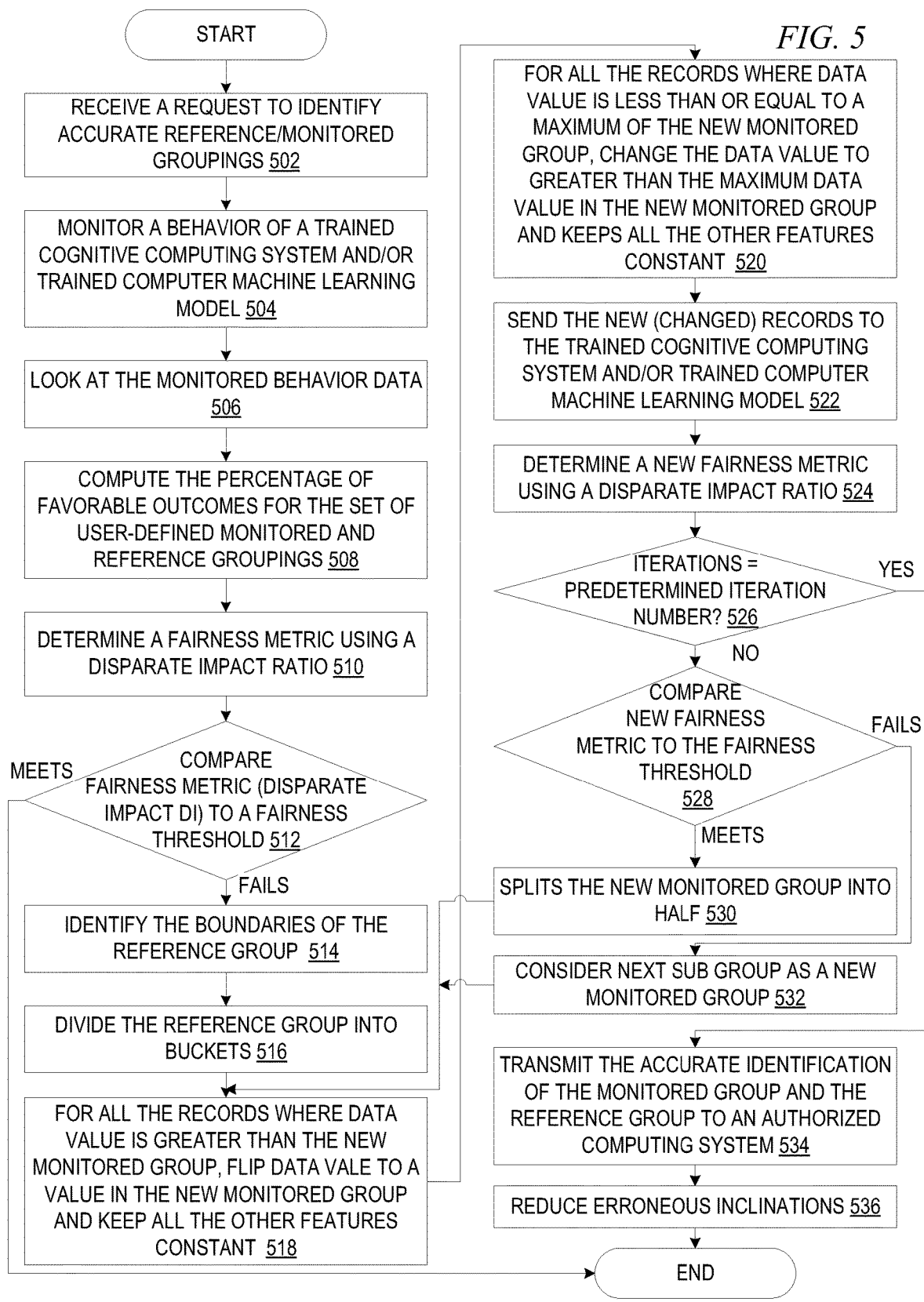

DECREASING ERROR IN A MACHINE LEARNING MODEL BASED ON IDENTIFYING REFERENCE AND MONITORED GROUPS OF THE MACHINE LEARNING MODEL

BACKGROUND

The present application relates generally to an improved data processing apparatus and method and more specifically to mechanisms for decreasing error in a machine learning model based on an identification of monitored and reference groups of the machine learning model.

Decision support computing systems rely on artificial intelligence and complex analytics to be able to perform analysis of large datasets, typically to identify patterns of data within the large datasets, to thereby generate insights into the data and provide such insights as a basis for making decisions. IBM Watson® (IBM Watson and all IBM Watson-based trademarks and logos are trademarks or registered trademarks of International Business Machines Corporation and/or its affiliates) cognitive system available from International Business Machines (IBM®) (IBM and all IBM-based trademarks and logos are trademarks or registered trademarks of International Business Machines Corporation and/or its affiliates) corporation of Armonk, New York is one example of a supercomputing system that combines artificial intelligence and complex analytics operating on large datasets to be able to make accurate predictions, automate aspects of decision support computing systems, and perform various recognition and classification operations that generate results upon which downstream computing systems base their operations. IBM Watson® has been used to implement various types of recognition, classification, decision support, and prediction computer operations including visual recognition, language translation, natural language classification, personality insights, tone analyzer, question answering, and even automated music composition and recipe generation.

The underlying artificial intelligence and analytics computing systems used in such decision support computing systems is dependent upon a machine learning process using a set of training data. If this training data comprises erroneous inclinations, i.e. erroneous inclination towards a group defined by a set of one or more attributes (often referred to as protected attributes), the erroneous inclinations will influence the training of the artificial intelligence computing system causing potential erroneous inclinations in operations of the computing systems that rely on the results of the artificial intelligence computing system to perform their operations, such as decision support operations. Such erroneous inclinations may result in incorrect results being generated by the artificial intelligence computing system and any downstream computing systems that rely on the results generated by the artificial intelligence computing system. Moreover, such erroneous inclinations may exist in the data upon which such artificial intelligence computer systems operate after training of the artificial intelligence computer system.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and memory, the memory comprising instructions executed by the processor to cause the processor to implement a machine learning model data quality improvement detection tool that identifies an accurate reference group and an accurate monitored group of a machine learning model. The illustrative embodiment monitors a behavior of the machine learning model for a predetermined time frame. The illustrative embodiment compares a determined fairness metric that utilizes a percentage of favorable outcomes of a user-defined monitored group and a percentage of favorable outcomes of a user-defined reference group to a pre-defined fairness threshold. The illustrative embodiment modifies the monitored group to include a first portion of the reference group thereby forming a modified monitored group and a modified reference group in response to the fairness metric failing to meet the pre-defined fairness threshold. The illustrative embodiment compares a newly determined fairness metric that utilizes a percentage of favorable outcomes of the modified monitored group and a percentage of favorable outcomes of the modified reference group to the pre-defined fairness threshold. The illustrative embodiment identifies the modified monitored group including the first portion of the user-defined reference group as a new monitored group and the modified reference group without the first portion of the user-defined reference group as a new reference group in response to the newly determined fairness metric meeting the pre-defined fairness threshold.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 5 is a flowchart outlining a second example of identifying accurate monitored and reference groups exhibited by a machine learning model and reducing erroneous inclinations of the machine learning model based on the identified accurate monitored and reference groups in accordance with one illustrative embodiment.

DETAILED DESCRIPTION

Figure 1:
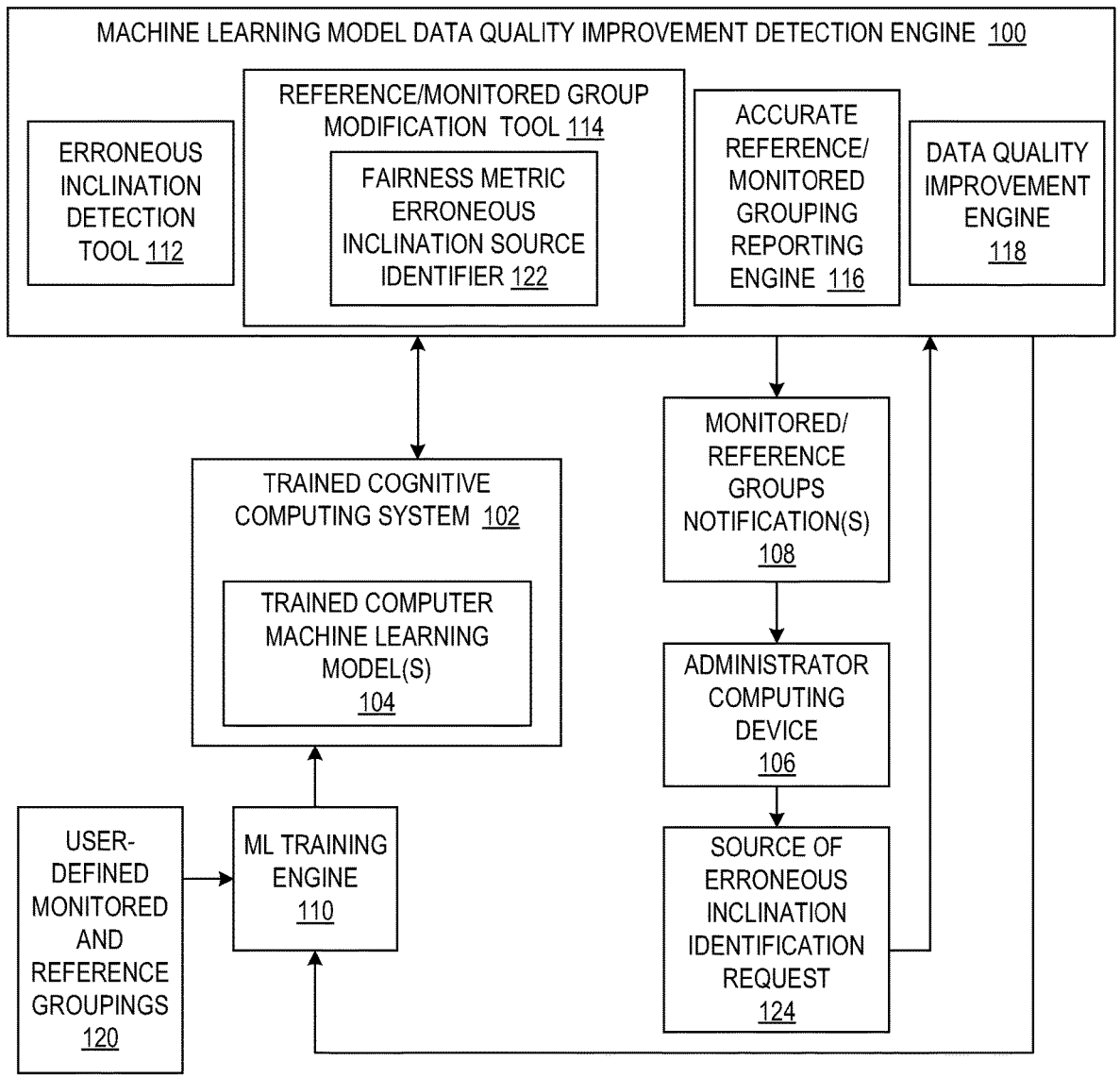
FIG. 1 is an example block diagram illustrating the primary operational components of an improved computing tool that performs error identification, erroneous inclination reduction, and/or corrective actions in accordance with one illustrative embodiment

As noted above, erroneous inclinations may cause incorrect operation of artificial intelligence computing systems and/or the downstream computing systems that operate on the results generated by such artificial intelligence computing systems. That is, artificial intelligence is a key element for modern-day applications and these modern-day applications are only effective when they are making accurate predictions. Any wrong prediction or a generalized insight about certain population may lead to higher error rates and more so may even lead to negative press publicity to enterprises. For example, a recruiting tool showing erroneous inclinations against a particular gender, a job recruitment tool showing erroneous inclinations towards applicants who are known to speak specific spoken languages, or an insurance tool making an insight that group A is prone to make more fraudulent insurance claims when compared to their counterpart group B, or to say the otherwise—group B makes valid claims when compared to group A, may have an adverse impact to the enterprise either directly or indirectly.

A key point is that it is not always true that the machine learning model is showing an error or inclination against one group as one sub-group of the group may as well get favorable outcomes. And, likewise, it is not always that the one group is making valid insurance claims as one sub-group of the group might be making fraudulent insurance claims as well. Similar to the way of detecting erroneous inclinations in the machine learning models is essential to build trust for any application or enterprise, it is equally important to precisely identify to which population group(s) that the machine learning model is making erroneous predictions so as to remove erroneous inclinations of the machine learning model by utilizing the refined the reference and monitored values.

There are multiple techniques that exist to detect erroneous inclinations in machine learning models for both regression and classification type models. These techniques compute whether the machine learning model is exhibiting erroneous inclination against a monitored group as compared its counterpart a reference group. For example, a loan machine learning model may be erroneously inclined to give 90% of favorable outcomes to loan applicants within group B as compared to only 75% of favorable outcomes to group A applicants. If a fairness calculation is determined using a disparate impact ratio, then the metric would turn out to be 75/90=83%. If a machine learning model validator has a fairness threshold as 90% (meaning at least 90% of the monitored population should get 90% of favorable outcomes) then an inference may be made that the machine learning model is erroneous inclined against the group A.

In order to detect such erroneous inclinations, a machine learning model data quality improvement detection engine receives specified input from a user as to a reference value and a monitored value. In the above example, the monitored value is associated with group A and the reference value is associated with group B. Many times, clients face a problem that they are not accurately aware of the monitored and reference ranges that need to be utilized, e.g., in the above use case, the machine learning model may also be acting in an erroneous manner for group B. The client may not be aware of the inaccurate specified reference value and monitored value, which may lead to lawsuits, negative publicity, or the like. Hence, the illustrative embodiments provide mechanisms for identifying accurate reference and monitored values utilized by a machine learning model so as to provide an accurate picture of the machine learning model behavior to the client. In addition, the illustrative embodiments provide mechanisms for removing erroneous inclinations of the machine learning model by utilizing the refining the reference and monitored values. In cases where the user has specified reference and monitored values that detect erroneous inclinations so as to accurately train an artificial intelligence (AI) computing system, such as a cognitive computing system, neural network computer model, deep learning network computer model, ensemble learning computer model, or any other machine learning computer model or computing system, the AI computing system and/or computer model may be retrained based on the identified accurate reference and monitored values so as to remove any erroneous inclinations in the training of the AI computing system or computer model.

It should be appreciated that the present invention provides an improved computer tool and improved computer tool operations that identify reference and monitored values utilized by a machine learning model so as to provide an accurate picture of the machine learning model behavior to the client, reduce erroneous inclinations, and perform a corrective operation for correcting the AI computing system and/or computer model after having reduced erroneous inclinations, e.g., a retraining operation based on the accurate reference and monitored values as a basis for the machine learning processes. The improved computing tool of the illustrative embodiments is specifically concerned with solving the issues, arising from computer technology, in the erroneous inclinations present in artificial intelligence computing systems or computer models that are trained by a machine learning process based on such reference and monitored values. Thus, the present invention is specifically directed to an improved computer tool solving a problem arising from computer technology.

As noted above, the illustrative embodiments identify erroneous inclinations within a machine learning model and, more specifically, accurately identify reference and monitored values identifying which population group(s) for which the machine learning model is making erroneous inclinations. Erroneous inclinations, in general, occurs when the count of favorable results for one group, also referred to as a "monitored", is much less than that of another, also referred to as a "reference," or that the count of favorable results for one group (reference) is much greater than that of another group (monitored), where "much less" or "much greater" are determined relative to established fairness threshold values, e.g., at least 90% of the monitored group obtain favorable outcomes as compared to the reference group. The reference or monitored groupings, in the context of the illustrative embodiments, are general designations of a range of values or categories of one or more protected attributes where erroneous inclinations are believed to potentially be present, however without a specific source of the erroneous inclinations being identified. The sources of erroneous inclinations may be specific instances or sub-ranges of protected attributes within the reference or monitored groupings.

The reference and monitored groupings indicate areas where there is potential erroneous inclination, but again, since these reference and monitored values are provided by the user, the provided reference and monitored values themselves may be inaccurate. For example, in a home loan decision making computing system, it may be determined that the home loan decision making computing system seems to be favoring a certain group of applicants (recommending loan approval) over one or more other groups of applicants (recommending denying the loan), such that a reference grouping and monitored grouping may be defined. However, the values for each or the monitored value and the reference value may themselves be inaccurate and thus, inaccurately identifying erroneous inclinations to be present in the results generated by the home loan decision making computing system.

The illustrative embodiments provide mechanisms for identifying accurate reference and monitored values for which the machine learning model is making decisions. For example, in one embodiment, the machine learning model data quality improvement detection mechanism monitors a behavior of the machine learning model every predetermined time frame, such as 1, hour 2 hours, or the like. Looking at the monitored behavior data, the machine learning model data quality improvement detection mechanism computes the percentage of favorable outcomes, e.g. 90%, for the predefined reference group, e.g. 26-80, and the percentage of favorable outcomes, e.g. 75%, for the predefined monitored group, e.g. 18-25. The machine learning model data quality improvement detection mechanism then determines a fairness metric using a disparate impact ratio. Put another way, assume that $R_{MAJ}$ is the rate of favorable outcomes for the reference group and $R_{MIN}$ is the rate of favorable outcomes for the monitored group. The disparate impact is the ratio of $R_{MIN}$ to $R_{MAJ}$, or $DI=R_{MIN}/R_{MAJ}$, $DI=75/90=83\%$. The machine learning model data quality improvement detection mechanism then compares the fairness metric (disparate impact DI) to a fairness threshold, e.g. 90%. If the fairness metric fails to meet the fairness threshold, the machine learning model data quality improvement detection mechanism splits the reference group into smaller buckets, e.g. split the reference group into buckets of size 2, such as 26-27, 28-29, 30-31, etc.

The machine learning model data quality improvement detection mechanism then moves the smaller bucket, e.g. 26-27, of the reference group bordering the monitored group to the monitored group and checks for fairness metric. The machine learning model data quality improvement detection mechanism then determines a fairness metric using a disparate impact ratio and compares the fairness metric (disparate impact DI) to a fairness threshold, e.g. 90%. If machine learning model data quality improvement detection mechanism determines that the newly calculated fairness metric fails to meet the fairness threshold, then the utilized smaller bucket, e.g. 26-27, is added to the monitored group and the machine learning model data quality improvement detection mechanism repeats the process analyzing and adding, if necessary, the smaller bucket bordering the monitored group until the fairness metric meets the fairness threshold. Once the fairness threshold is met, the last analyzed smaller bucket is added to the monitored group and the new ranges for the monitored group and reference group are output to the data quality improvement engine for reducing erroneous inclinations of the machine learning model. That is, the newly identified ranges for the monitored and reference groups may be utilized in retraining the machine learning model using data that accurately reflects the monitored and reference grouping that the client wants.

Even though the reference and monitored groupings are identified based on results of the machine learning model data quality improvement detection mechanism, it should be appreciated that not all entities within the reference or monitored groupings contribute to erroneous inclinations. It is important to be able to localize or pinpoint the particular sub-groups of entities which actually are a cause or source of erroneous inclinations in the reference and monitored groupings.

Therefore, in a second embodiment, the machine learning model data quality improvement detection mechanism monitors a behavior of the machine learning model every predetermined time frame, such as 1, hour 2 hours, or the like. Looking at the monitored behavior data, the machine learning model data quality improvement detection mechanism computes the percentage of favorable outcomes, e.g. 90%, for the predefined reference group, e.g. 26-80, and the percentage of favorable outcomes, e.g. 75%, for the predefined monitored group, e.g. 18-25. The machine learning model data quality improvement detection mechanism then determines a fairness metric using a disparate impact ratio. Put another way, assume that $R_{MAJ}$ is the rate of favorable outcomes for the reference group and $R_{MIN}$ is the rate of favorable outcomes for the monitored group. The disparate impact is the ratio of $R_{MIN}$ to $R_{MAJ}$, or $DI=R_{MIN}/R_{MAJ}$, $DI=75/90=83\%$. The machine learning model data quality improvement detection mechanism then compares the fairness metric (disparate impact DI) to a fairness threshold, e.g. 90%. If the fairness metric fails to meet the fairness threshold, the machine learning model data quality improvement detection mechanism identifies the boundaries of the reference group. Continuing with the example, the boundaries of the reference group may be 26 and 80. The machine learning model data quality improvement detection mechanism then divides the reference group into buckets where the bucket size is 10% of the size of reference thus, the buckets would be: $(80-26)/10=5.4$ which would be rounded off to 5. So the first bucket that the machine learning model data quality improvement detection mechanism would consider would be 26-30. That is, the machine learning model data quality improvement detection mechanism considers that there is an additional monitored group of 26-30 and the reference group will be 31-80.

For the new monitored group of 26-30, the machine learning model data quality improvement detection mechanism uses data perturbation. Data perturbation is a data security technique that adds 'noise' to databases allowing individual record confidentiality. This technique allows users to ascertain key summary information about the data that is not distorted and does not lead to a security breach. Therefore, for all the records that the machine learning model data quality improvement detection mechanism received in the last predetermined time frame, if the data value is greater than 30, the machine learning model data quality improvement detection mechanism flips the data value to a value between 26-30 and sends the data value back to the machine learning model to understand how the machine learning model handles the perturbed record. For example, if a claim has a data value of 40, the machine learning model data quality improvement detection mechanism changes the data value to say 27 and keeps all the other features constant. The machine learning model data quality improvement detection mechanism sends the new (changed) record to the machine learning model to determine whether the machine learning model predicts that claim is fraudulent or not. Similarly, for a record where the data value is less than or equal to 30, e.g. data value of 27, the machine learning model data quality improvement detection mechanism changes the data value to say 40 and keeps all the other features constant. The machine learning model data quality improvement detection mechanism sends the new (changed) record to the machine learning model to determine whether the machine learning model predicts that claim is fraudulent or not.

The machine learning model data quality improvement detection mechanism then determines a fairness metric using a disparate impact ratio based on the original record data and the newly considered perturbed record data to determine whether the machine learning model is truly acting in an erroneously inclined manner in the group 26-30. If the newly determined fairness metric meets the fairness threshold, indicating that the machine learning model is not acting in an erroneously inclined manner, then the machine learning model data quality improvement detection mechanism splits the new monitored group of 26-30 into half and repeat the process, e.g., the machine learning model data quality improvement detection mechanism considers group of 26-28 as the new monitored group repeats the process. If, on the other hand, the newly determined fairness metric fails to meet the fairness threshold, indicating that the machine learning model is acting in an erroneously inclined manner, the machine learning model data quality improvement detection mechanism considers the next group of 31-35 as a new monitored group and repeats the process. The machine learning model data quality improvement detection mechanism may repeat the process for a predetermined number of iterations, e.g. 5 iterations, and, if at the end of the predetermined number of iterations, the machine learning model is consistently exhibiting erroneous inclinations for the new monitored group, then a new monitored group range of the original plus any new monitored group(s) and the modified reference group minus the new monitored group(s) is recommended to the user as a new monitored/reference group ranges.

Evaluating the fairness metric on the reference/monitored group as a whole provides an indication of whether erroneous inclinations exists or not based on the accepted ranges of fairness metrics indicating fairness or erroneous inclination. e.g., for a disparate impact fairness metric, which is the ratio of rate of favorable outcome for the monitored group to that of the reference group, it has been determined that an ideal value is 1.0, i.e. the rates are the same, however an AI computing system or computer model is considered to be fair and not erroneously inclined if this fairness metric is anywhere in the range from 0.8 to 1.0 (this range may be user specified or otherwise configurable in the inputs provided to the tool). Thus, if the disparate impact fairness metric has a value less than 1.0 this implies a higher benefit for the reference group, with a value less than 0.8 indicating erroneously inclined in favor of the reference group, and if it has a value greater than 1.0 this implies a higher benefit for the monitored group, i.e. an erroneously inclined in favor of the monitored group.

Evaluating the fairness metric of each sub-group relative the fairness metric of the group as a whole provides insights into which sub-group(s) are the source of any detected erroneous inclinations. The fairness metric for a sub-group is calculated with the sub-group standing in for the corresponding reference/monitored group in the particular fairness metric. For example, in a disparate impact fairness metric, where the rate of favorable outcome of the reference group as a whole would be used in the denominator, for a sub-group in the reference, only the rate of favorable outcomes within that sub-group would be used in the fairness metric for that sub-group while the monitored group ratio of favorable outcomes would remain the same as for the entire monitored group.

This same process may be performed for cases where the protected attribute is a categorical value rather than a numeric value or range of values, such as in the case of ethnicity, for example. In such a case the reference grouping may be a particular set of ethnicities and the monitored grouping may be a different set of ethnicities. For each, the groups are divided into individual sub-groups corresponding to each individual category within that group. Thus, if a reference group comprises group A for example, then two sub-groups, one for group A1 and one for group A2, would be generated. Similarly, if the monitored group comprises group B, group C, and group D, then 3 sub-groups may be generated, one for each of group B, group C, and group D. A similar evaluation may then be performed for the reference/monitored groups as a whole and then for each sub-group so as to determine the fairness metrics for each and then compare them to identify potential sources of improving data quality.

Thus, potential sources of improving data quality are specifically identified or localized within the reference and/or monitored groupings developed from the erroneous inclination detection tool results. These potential sources of improving data quality pinpoint the particular sub-groups within the reference and/or monitored groupings. The granularity of such groupings may be configured to any desirable range of values and/or categories.

Thus, the mechanisms of the illustrative embodiments provide an improved computing tool and computing tool operation that identifies reference and monitored values utilized by a machine learning model so as to provide an accurate picture of the machine learning model behavior to the client, reduce erroneous inclination, and perform a corrective operation for correcting the AI computing system and/or computer model after having reduced erroneous inclinations, e.g., a retraining operation based on the accurate reference and monitored values as a basis for the machine learning processes. The data quality improvement may be determined based on fairness metric evaluations and/or explanation based determinations. Based on the identified data quality improvement, improvement of data quality operations may be performed to remove the erroneous inclination based on the accurate reference and monitored values as a basis for the machine learning processes. In cases where an AI computing system or computer model has been trained using the original reference and monitored groupings, corrective operations may be performed to retrain the AI computing system or computer model based on the accurate reference and monitored groupings to thereby reduce any erroneous inclination present in the operation of the trained AI computing system or computer model.

Before continuing the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

As noted above, the present invention provides mechanisms in an improved computer tool and computer tool operation for identifying accurate reference and monitored values utilized by a machine learning model so as to provide an accurate picture of the machine learning model behavior to the client, reduce erroneous inclination, and perform a corrective operation for correcting the AI computing system and/or computer model after having reduced erroneous inclinations, e.g., a retraining operation based on the accurate reference and monitored values as a basis for the machine learning processes. The trained artificial intelligence based computing system or computer model may be implemented as part of or utilized by a cognitive computing system that employs the trained artificial intelligence (AI) based computing system or computer model to generate results upon which the cognitive computing system operates to generate cognitive computing responses to user requests, for example, e.g., answering natural language questions, performing image recognition, generating recommendations, decision support operations, or any other cognitive computing operation. The cognitive computing system may comprise any artificial intelligence based computing system that is trained through a machine learning process so as to generate results from given inputs, where the results have an acceptable level of error or loss after such training. For example, the cognitive computing system may be comprised of a single neural network, multiple neural networks, one or more rules based engines, a deep learning computing system such as the IBM Watson™ cognitive computing system, or the like. For purposes of illustration in the description of the illustrative embodiments hereafter, the cognitive computing system will be assumed to be the IBM Watson™ cognitive computing system, and in particular an implementation of the IBM Watson™ cognitive computing system in which one or more deep learning neural networks trained through a machine learning process, supervised or unsupervised, is implemented.

The AI computing system or computer model of the cognitive computing system is trained through a machine learning process that involves an iterative adjustment of operational parameters of the machine learning computer models employed by the cognitive computing system so as to minimize an error or loss in the outputs or results generated by the cognitive computing system. For example, in the case of a neural network, the weights of nodes in the neural network may be iteratively adjusted based on the input of training data and the comparison of outputs or results to expected outputs/results (ground truth) which indicates an error or loss. The iterative adjustment may be based on an identification of features that were most influential in the generation of the output such that the weights associated with nodes processing such features may be adjusted to minimize the influence of those features on the output and thus, reduce the loss or error in the output generated. This machine learning process is referred to as training the machine learning computer model or training the cognitive computing system herein.

Through the training of an AI computing system or computer model of the cognitive computing system, erroneous inclinations may be inadvertently introduced into the operation of the cognitive computing system due to such erroneous inclinations being present in training datasets. For example, in the case of certain erroneous inclinations, training datasets may associate one group over another, traditional or stereotypical associations of characteristics, objects, events, etc. which reflect an erroneous inclination (whether it be a positive or negative erroneous inclination), e.g., likes, dislikes, limitations, strengths, etc. For example, an erroneous inclination may be that group X prefers the color "pink" and group Y does not prefer the color "pink" or that group X likes to play with "dolls" and group Y does not like to play with dolls. Such erroneous inclinations may be present in the training datasets in various ways, e.g., a relative number of training data instances having correct results being "pink" or "dolls" for corresponding features of "group X" being substantially greater than other possible results. Erroneous inclinations may be associated with different types of protected attributes including gender, ethnicity, age, or any other protected attribute specific to the types of entities for which erroneous inclinations are being evaluated.

The problem with erroneous inclinations embedded into cognitive computing systems, or trained AI computing systems or computer models employed by these cognitive computing systems, is that the results generated by these systems/models may be incorrect. The reference of the time, the output of a trained cognitive computing system or trained computer model is processed through additional computer logic within a calling application. Depending on the calling application, various incorrect outcomes could result. For example, trained cognitive computing systems or trained computer models with erroneous inclinations "trained in" or embedded in the cognitive computing system and/or computer models could possibly cause erroneously inclined financial decisions, erroneously inclined decisions about the incarcerated, erroneously inclined decisions about educational needs and projects, etc. Practically any current system in use today that utilizes the operation of a trained AI computing system or computer model component has a possibility of erroneous inclinations being "trained in" and used indirectly to make decisions based on these erroneous inclinations. The entities using such erroneous inclination cognitive computing systems and/or computer models, e.g., companies, governmental agencies, or other individuals or organizations, may experience legal or public dissatisfaction issues.

The illustrative embodiments provide mechanisms for identifying reference and monitored values utilized by a machine learning model so as to provide an accurate picture of the machine learning model behavior to the client, reduce erroneous inclinations, and perform a corrective operation for correcting the AI computing system and/or computer model after having reduce erroneous inclinations, e.g., a retraining operation based on the accurate reference and monitored values as a basis for the machine learning processes. While numerical data value specific erroneous inclinations are used as a primary example throughout this description, it should be appreciated that the mechanisms of the illustrative embodiments may be implemented to identify any type of erroneous inclination that may be present in the operation of an AI computing system or computer model, such as erroneous inclinations for/against particular parties, organizations, objects, etc. for various reasons, e.g., erroneous inclinations toward/against a particular political party, a particular special interest group, etc. Moreover, the erroneous inclination that is identifiable may be either positive or negative erroneous inclination, as the mechanisms are configured to identify erroneous inclinations itself. Whether or not the erroneous inclination is "negative" or "positive" is a human judgement and is not relevant to the operation of the mechanisms of the illustrative embodiment.

The mechanisms of the illustrative embodiments may be configured to operate on a dataset associated with a detected erroneous inclination to identify accurate reference and monitored values utilized by a machine learning model so as to provide an accurate picture of the machine learning model behavior to the client. This detected erroneous inclination may be detected in the operation of an already trained AI computing system or computer model (assumed hereafter to be a computer model, such as a neural network, deep learning network, or the like, for ease of explanation) which may or may not have a configuration, due to training, which introduces erroneous inclinations into the results generated by the trained computer model. It should be appreciated that when reference is made to the trained computer model herein, such references may also be considered directed to a trained cognitive computing system in which such trained AI computing systems or computer models are implemented. That is, a trained cognitive computing system may use one or more trained computer models to perform cognitive computing operations, however the mechanisms of the claimed invention may be applied to a single trained computer model as well. Thus, the description of mechanisms of the illustrative embodiments with references to a trained computer models may also be applied to trained cognitive computing system as well.

As an overview, a cognitive computing system (or more simply a "cognitive system") is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process, but within the limitations of a computer architecture, as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware.

The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, financial trend analysis, financial investment recommendations, credit scoring and credit/loan approval recommendations, and other types of recommendation generation, e.g., items of interest to a particular user, potential new contact recommendations, or the like. IBM Watson™ is an example of one such cognitive system which can process human readable language and identify inferences between text passages with human-like high accuracy at speeds far faster than human beings and on a larger scale. The IBM Watson® cognitive system has many different implementations in which the IBM Watson® cognitive system has been configured for different cognitive functions, e.g., IBM Chef Watson® (IBM Chef Watson and all IBM Chef Watson-based trademarks and logos are trademarks or registered trademarks of International Business Machines Corporation and/or its affiliates) generates recipes for users, IBM Watson Ads™ provides an artificial intelligence (AI) solution for advertising, and IBM Watson Health™ provides a number of different tools for implementing AI solutions to perform various patient health related cognitive computing functions, etc.

FIG. 1 is an example block diagram illustrating the primary operational components of an improved computing tool that performs erroneous inclination identification, dataset data quality improvement, and/or corrective actions in accordance with one illustrative embodiment. As shown in FIG. 1, the primary operational components include a machine learning model data quality improvement detection mechanism 100 that operates to detect the presence of erroneous inclinations, via an accurate identification of a monitored group and a reference group, in the operation of a trained cognitive computing system 102 and/or trained computer machine learning model 104 and reports these accurate monitored/reference groups to an administrator computing device 106 in a monitored/reference groups notifications 108. In some illustrative embodiments, the identification of the erroneous inclination, i.e. initial monitored and reference groupings, is also a basis upon which the machine learning model data quality improvement detection mechanism 100 performs a data quality improvement operation to address the erroneous inclination. Accurate identification of a monitored group and a reference group may be used as a basis for performing corrective operations with regard to the trained cognitive computing system 102 and/or trained computer machine learning model 104, such as retraining the trained computer machine learning model 104 via a machine learning training engine 110 that uses the accurate identification of a monitored group and a reference group to perform the retraining.

The machine learning model data quality improvement detection engine 100 may include an erroneous inclination detection tool 112, a reference/monitored group modification tool 114, an accurate reference/monitored grouping reporting engine 116, and a data quality improvement engine 118. It should be appreciated that these are the primary operational elements of the machine learning model data quality improvement detection mechanism 100 and other elements may also be present for facilitating the operations of these primary operational elements. For example, various communication elements, control elements, and the like, which facilitate the interaction of the primary operational elements with each other and with components of other computing systems, may be provided, but are not depicted for ease of explanation of the improvements provided by the improved computing tool and improved computing operations of the illustrative embodiments.

The data quality improvement detection tool 112 provides the computer executed logic and data structures used to perform erroneous inclination detection in the operation of an AI computing system or computer model, such as trained cognitive computing system 102 and/or trained computer machine learning model 104. The data quality improvement detection tool 112 only detects the presence of erroneous inclinations in the operation of the computing system/computer model. Examples of data quality improvement detection tools 112 which may be utilized to detect the presence of erroneous inclinations may include the data quality improvement detection tool such as that described in the co-pending U.S. patent application Ser. No. 16/589,314, the AI Fairness 360 tool available from IBM® Corporation, or any other erroneous inclination detection tool currently available or later developed.

Responsive to receiving a request to identify accurate reference/monitored groupings, the data quality improvement detection tool 112 operates on results generated by the trained cognitive computing system 102 and/or trained computer machine learning model 104 (which in some cases may be independent of the trained cognitive computing system 102 and not necessarily integrated into the computing system 102) based on a processing of an input dataset. That is, the data quality improvement detection tool 112 monitors a behavior of the trained cognitive computing system 102 and/or trained computer machine learning model 104 every predetermined time frame, such as 1, hour 2 hours, or the like.

Utilizing a set of user-defined monitored and reference groupings 120, in one embodiment, the reference/monitored group modification tool 114 looks at the monitored behavior data detected by the data quality improvement detection tool 112 and computes the percentage of favorable outcomes for the set of user-defined monitored and reference groupings 120, e.g. 90%, for the user-defined reference group, e.g. 26-80, and the percentage of favorable outcomes, e.g. 75%, for the user defined monitored group, e.g. 18-25. A fairness metric erroneous inclination source identifier 122 of the reference/monitored group modification tool 114 then determines a fairness metric using a disparate impact ratio. Put another way, assuming that $R_{MAJ}$ is the rate of favorable outcomes for the reference group and $R_{MIN}$ is the rate of favorable outcomes for the monitored group, the fairness metric erroneous inclination source identifier 122 determines a disparate impact that is the ratio of $R_{MIN}$ to $R_{MAJ}$, or $DI=R_{MIN}/R_{MAJ}$, DI=75/90=83%. The fairness metric erroneous inclination source identifier 122 then compares the fairness metric (disparate impact DI) to a fairness threshold, e.g. 90%. If the fairness metric erroneous inclination source identifier 122 determines that the fairness metric fails to meet the fairness threshold, the reference/monitored group modification tool 114 splits the reference group into smaller buckets, e.g. split the reference group into buckets of size 2, such as 26-27, 28-29, 30-31, etc.

The reference/monitored group modification tool 114 then moves the smaller bucket, e.g. 26-27, of the reference group bordering the monitored group to the monitored group and then rechecks for fairness metric. That is, the fairness metric erroneous inclination source identifier 122 determines a fairness metric using a disparate impact ratio and compares the fairness metric (disparate impact DI) to the fairness threshold, e.g. 90%. If the fairness metric erroneous inclination source identifier 122 determines that the newly calculated fairness metric fails to meet the fairness threshold, then the reference/monitored group modification tool 114 adds the utilized smaller bucket, e.g. 26-27, to the monitored group and repeats the process analyzing and adding, if necessary, each smaller bucket bordering the monitored group until the fairness metric meets the fairness threshold. Once the reference/monitored group modification tool 114 determines that the fairness threshold is met, the reference/monitored group modification tool 114 adds the last analyzed smaller bucket to the monitored group. Having identified a new monitored group and new reference group, the accurate identification of the monitored group and the reference group may be transmitted as a monitored/reference groups notifications 108 by the accurate reference/monitored grouping reporting engine 116 to an authorized computing system, such as administrator computing device 106. Moreover, such notifications may be logged or otherwise stored for later retrieval and use in evaluating the operation of the trained cognitive computing system 102 and/or trained computer machine learning model 104. In response to receiving the monitored/reference groups notifications 108, a user of the administrator computing device 106 may provide a request to the machine learning model data quality improvement detection mechanism 100 to reduce erroneous inclinations of the trained cognitive computing system 102 and/or trained computer machine learning model 104, e.g., re-training of the trained computer machine learning model 104. In some illustrative embodiments, data quality improvement actions may be requested with an original request to identify accurate reference/monitored groupings 124 or may be performed automatically in response to identifying the accurate reference/monitored groupings.

The data quality improvement engine 118 is provided by the machine learning model data quality improvement detection mechanism 100 to address the newly identified accurate reference/monitored groupings identified in the monitored/reference groups notifications 108. That is, utilizing the newly identified ranges for the monitored and reference groups, data quality improvement engine 118 may initiate a retraining of the trained cognitive computing system 102 and/or trained computer machine learning model 104 via the machine learning training engine 110 utilizing data that more accurate reflects the set of user-defined monitored and reference groupings 120 or another set of monitored and reference groupings based on the needs of the client.

In a second embodiment, responsive to receiving a request to identify accurate reference/monitored groupings, the erroneous inclination detection tool 112 again operates on results generated by the trained cognitive computing system 102 and/or trained computer machine learning model 104 (which in some cases may be independent of the trained cognitive computing system 102 and not necessarily integrated into the computing system 102) based on a processing of an input dataset. That is, the erroneous inclination detection tool 112 monitors a behavior of the trained cognitive computing system 102 and/or trained computer machine learning model 104 every predetermined time frame, such as 1, hour 2 hours, or the like.

Utilizing a set of user-defined monitored and reference groupings 120, the reference/monitored group modification tool 114 looks at the monitored behavior data detected by the erroneous inclination detection tool 112 and computes the percentage of favorable outcomes for the set of user-defined monitored and reference groupings 120, e.g. 90%, for the user-defined reference group, e.g. 26-80, and the percentage of favorable outcomes, e.g. 75%, for the user defined monitored group, e.g. 18-25. A fairness metric erroneous inclination source identifier 122 of the reference/monitored group modification tool 114 then determines a fairness metric using a disparate impact ratio. Put another way, assuming that $R_{MAJ}$ is the rate of favorable outcomes for the reference group and $R_{MIN}$ is the rate of favorable outcomes for the monitored group, the fairness metric erroneous inclination source identifier 122 determines a disparate impact that is the ratio of $R_{MIN}$ to $R_{MAJ}$, or $DI=R_{MIN}/R_{MAJ}$, $DI=75/90=83\%$. The fairness metric erroneous inclination source identifier 122 then compares the fairness metric (disparate impact DI) to a fairness threshold, e.g. 90%.

If the fairness metric fails to meet the fairness threshold, the reference/monitored group modification tool 114 identifies the boundaries of the reference group. Continuing with the example, the boundaries of the reference group would be 26 and 80. The reference/monitored group modification tool 114 then divides the reference group into buckets where the bucket size is 10% of the size of reference thus, the buckets would be: $(80-26)/10=5.4$ which would be rounded off to 5. So the first bucket that reference/monitored group modification tool 114 would consider would be 26-30. That is, the reference/monitored group modification tool 114 considers that there is an additional monitored group of 26-30 and the reference group will be 31-80.

For the new monitored group of 26-30, reference/monitored group modification tool 114 uses data perturbation. Data perturbation is a data security technique that adds 'noise' to databases allowing individual record confidentiality. This technique allows users to ascertain key summary information about the data that is not distorted and does not lead to a security breach. Therefore, for all the records that the machine learning model data quality improvement detection engine 100 received in the last predetermined time frame, if the data value is greater than 30, reference/monitored group modification tool 114 flips the data value to a value between 26-30 and send it back to the trained cognitive computing system 102 and/or trained computer machine learning model 104 to understand how the trained cognitive computing system 102 and/or trained computer machine learning model 104 handles the perturbed record. For example, if a claim is made with a data value of 40, the reference/monitored group modification tool 114 changes the data value to say 27 and keeps all the other features constant. The reference/monitored group modification tool 114 sends the new (changed) record to the trained cognitive computing system 102 and/or trained computer machine learning model 104 to determine whether the trained cognitive computing system 102 and/or trained computer machine learning model 104 predicts that claim is fraudulent or not. Similarly, for a record where the data value is less than or equal to 30, e.g. data value of 27, the reference/monitored group modification tool 114 changes the data value to say 40 and keeps all the other features constant. The reference/monitored group modification tool 114 sends the new (changed) record to the trained cognitive computing system 102 and/or trained computer machine learning model 104 to determine whether the trained cognitive computing system 102 and/or trained computer machine learning model 104 predicts that claim is fraudulent or not.

The fairness metric erroneous inclination source identifier 122 then determines a fairness metric using a disparate impact ratio based on the original record data and the newly considered perturbed record data to determine whether the trained cognitive computing system 102 and/or trained computer machine learning model 104 is truly acting in an erroneous manner in the group of 26-30. If the newly determined fairness metric meets the fairness threshold, indicating that the trained cognitive computing system 102 and/or trained computer machine learning model 104 is not acting in an erroneous manner, then the reference/monitored group modification tool 114 splits the new monitored group of 26-30 into half and repeat the process, e.g., the reference/monitored group modification tool 114 considers the group of 26-28 as the new monitored group repeats the process. If, on the other hand, the newly determined fairness metric fails to meet the fairness threshold, indicating that the trained cognitive computing system 102 and/or trained computer machine learning model 104 is acting in an erroneous manner, the reference/monitored group modification tool 114 considers the next group of 31-35 as a new monitored group and repeats the process. The reference/monitored group modification tool 114 may repeat the process for a predetermined number of iterations, e.g. 5 iterations, and, if at the end of the predetermined number of iterations, the trained cognitive computing system 102 and/or trained computer machine learning model 104 is consistently exhibiting erroneous inclinations for the new monitored group, then a new monitored group range of the original monitored group plus any new monitored group(s) and the modified reference group minus the new monitored group(s) may be transmitted as a monitored/reference groups notifications 108 by the accurate reference/monitored grouping reporting engine 116 to an authorized computing system, such as administrator computing device 106. Moreover, such notifications may be logged or otherwise stored for later retrieval and use in evaluating the operation of the trained cognitive computing system 102 and/or trained computer machine learning model 104. In response to receiving the monitored/reference groups notifications 108, a user of the administrator computing device 106 may provide a request to the machine learning model data quality improvement detection mechanism 100 to reduce erroneous inclinations of the trained cognitive computing system 102 and/or trained computer machine learning model 104, e.g., re-training of the trained computer machine learning model 104. In some illustrative embodiments, data quality improvement actions may be requested with an original request to identify accurate reference/monitored groupings 124 or may be performed automatically in response to identifying the new monitored group range.

The data quality improvement engine 118 is provided by the machine learning model data quality improvement detection mechanism 100 to address the newly identified reference/monitored groupings identified in the monitored/reference groups notifications 108. That is, utilizing the newly identified ranges for the monitored and reference groups, data quality improvement engine 118 may initiate a retraining of the trained cognitive computing system 102 and/or trained computer machine learning model 104 via the machine learning training engine 110 utilizing data that more accurate reflects the set of user-defined monitored and reference groupings 120 or another set of monitored and reference groupings based on the needs of the client.

Thus, again, the mechanisms of the illustrative embodiments provide an improved computing tool and computing tool operation that identifies reference and monitored values utilized by a machine learning model so as to provide an accurate picture of the machine learning model behavior to the client, reduce erroneous inclinations, and perform a corrective operation for correcting the AI computing system and/or computer model after having reduce erroneous inclinations, e.g., a retraining operation based on the accurate reference and monitored values as a basis for the machine learning processes. The erroneous inclination may be determined based on fairness metric evaluations and/or explanation based determinations. Based on the identified erroneous inclination, data quality improvement operations may be performed to remove the erroneous inclination based on the accurate reference and monitored values as a basis for the machine learning processes. In cases where an AI computing system or computer model has been trained using the original reference and monitored groupings, corrective operations may be performed to retrain the AI computing system or computer model based on the actual reference and monitored groupings to thereby reduce any erroneous inclinations present in the operation of the trained AI computing system or computer model.

Figure 2:
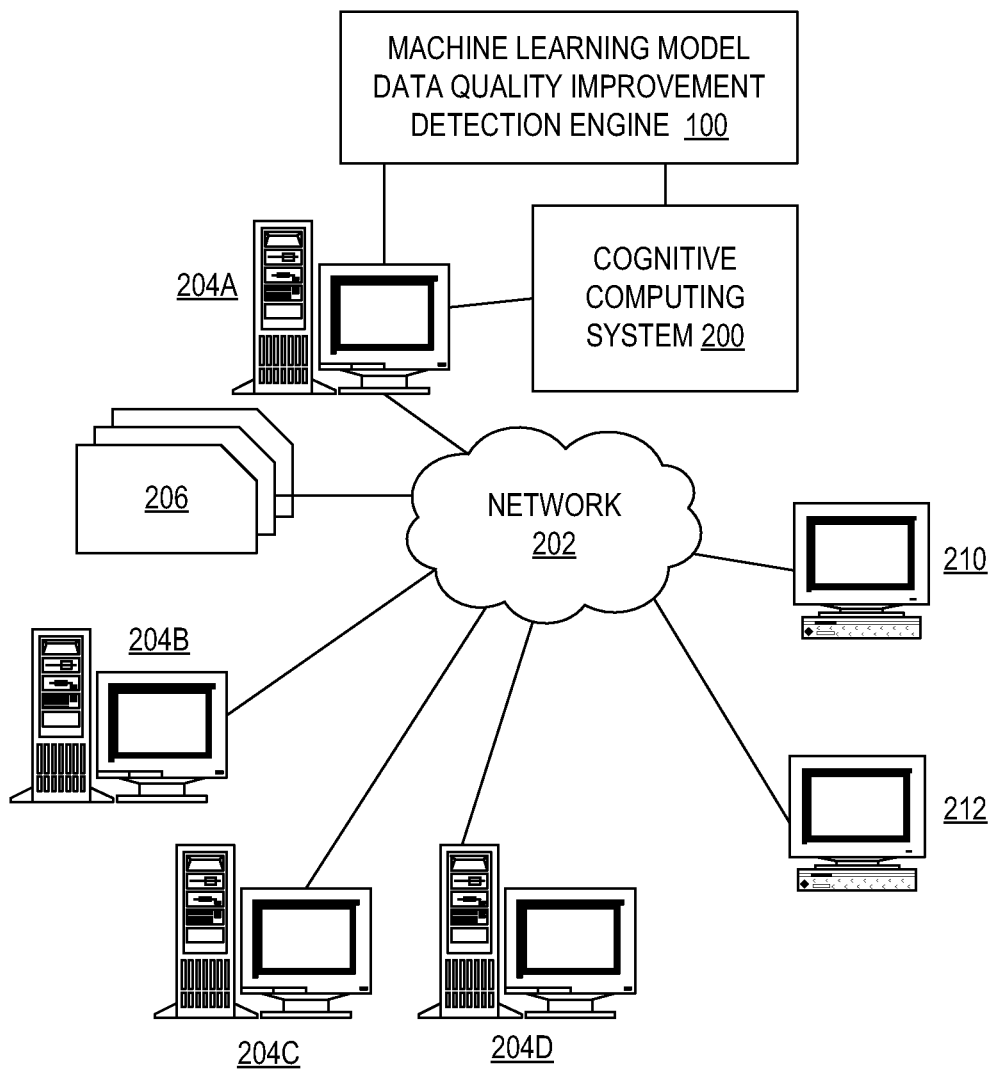
FIG. 2 is an example block diagram of an example distributed data processing system environment in which aspects of the illustrative embodiments may be implemented.

As the present invention is specifically directed to computer technology and specifically to an improved computing tool and computing tool operations for identifying sources of erroneous inclinations in datasets used by artificial intelligence computing systems and/or computing models, it is clear that the present invention may be implemented in various computing environments and with various types of data processing systems. FIG. 2 is an example block diagram of an example distributed data processing system environment in which aspects of the illustrative embodiments may be implemented.

As shown in FIG. 2, a cognitive computing system 200, which may employ one or more trained computer models, such as neural networks, deep learning networks, ensemble learning systems, and the like, is provided on one or more server computing devices 204A-D comprising one or more processors and one or more memories, and potentially any other computing device elements generally known in the art including buses, storage devices, communication interfaces, and the like, connected to the computer network 202. For purposes of illustration only, FIG. 2 depicts the cognitive system 200 being implemented on computing device 204A only, but as noted above the cognitive system 200 may be distributed across multiple computing devices, such as a plurality of computing devices 204A-D.

The network 202 includes multiple computing devices 204A-D, which may operate as server computing devices, and 210-212 which may operate as client computing devices, e.g., an administrator computing system such as 106 in FIG. 1, in communication with each other and with other devices or components via one or more wired and/or wireless data communication links, where each communication link comprises one or more of wires, routers, switches, transmitters, receivers, or the like. In some illustrative embodiments, the cognitive system 200 and network 202 enables question processing and answer generation (QA) functionality for one or more cognitive system users via their respective computing devices 210-212. In other embodiments, the cognitive system 200 and network 202 may provide other types of cognitive operations including, but not limited to, request processing and cognitive response generation which may take many different forms depending upon the desired implementation, e.g., cognitive information retrieval, training/instruction of users, cognitive evaluation of data, recommendation generation, data pattern analysis, or the like. Other embodiments of the cognitive system 200 may be used with components, systems, sub-systems, and/or devices other than those that are depicted herein.

The cognitive computing system 200 and/or computing models employed by the cognitive computing system 200, may be trained on and/or operate on one or more input datasets provided by one or more of the computing devices 204A-D, 210-212 or otherwise provided via a network attached storage 206 or other source of data accessible via the network 202. For example, a user of a computing device 210 may provide a computer model and corresponding training dataset to a computing model training and hosting service provided via server 204A which then trains the computing model based on the training dataset and deploys the trained computer model as part of the cognitive computing system 200 for use. Such an arrangement may be provided via a cloud based cognitive computing service, for example.

As shown in FIG. 2, in accordance with one illustrative embodiment, the machine learning model data quality improvement detection mechanism 100 of FIG. 1 may be implemented on one or more of the server computing devices 204A-D. The machine learning model data quality improvement detection mechanism 100 operates as previously described above to detect erroneous inclinations in the operation of the cognitive computing system, and then to identify the sources of the erroneous inclinations in the input dataset, as well as reducing erroneous inclinations and retraining of computer models and/or the cognitive computing system 200. While FIG. 2 shows the machine learning model data quality improvement detection mechanism 100 as being implemented on the same computing device 204A as the cognitive computing system 200, this is not a requirement and in fact they may be implemented on separate computing devices with accessibility by the machine learning model data quality improvement detection mechanism 100 to the cognitive computing system 200 and/or computing models employed by the cognitive computing system, as well as the input dataset being provided via the network 202.

Figure 3:
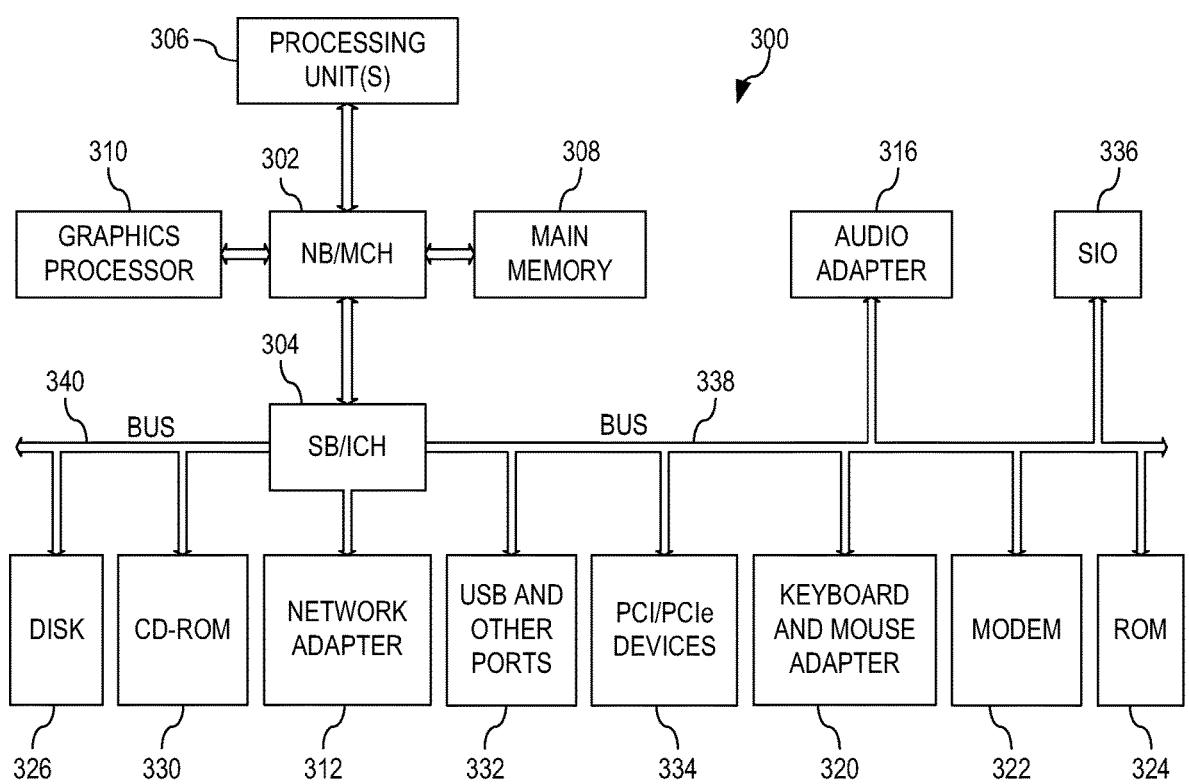
FIG. 3 is an example block diagram of an example computing device in which aspects of the illustrative embodiments may be implemented.

FIG. 3 is an example block diagram of an example computing device in which aspects of the illustrative embodiments may be implemented. As shown in FIG. 3, in the depicted distributed data processing system, data processing system 300 is an example of a computer, such as server 204A or client 210 in FIG. 2, in which computer usable code or instructions implementing the processes for illustrative embodiments of the present invention are located. In one illustrative embodiment, FIG. 3 represents a server computing device, such as a server 204A, which implements a cognitive system 200 and/or the machine learning model data quality improvement detection mechanism 100. FIG. 3 is just an example of one type of computing system in which the cognitive computing system 200 and/or the machine learning model data quality improvement detection mechanism 100 may be implemented and other architectures may also be utilized.

In the depicted example, data processing system 300 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 is connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash basic input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 is connected to SB/ICH 304.

An operating system runs on processing unit 306. The operating system coordinates and provides control of various components within the data processing system 300 in FIG. 3. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 300.

As a server, data processing system 300 may be, for example, an IBM® eServer™ System P® computer system, running the Advanced Interactive Executive (AIX®) operating system or the LINUX® operating system. Data processing system 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and are loaded into main memory 308 for execution by processing unit 306. The processes for illustrative embodiments of the present invention are performed by processing unit 306 using computer usable program code, which is located in a memory such as, for example, main memory 308, ROM 324, or in one or more peripheral devices 326 and 330, for example.

A bus system, such as bus 338 or bus 340 as shown in FIG. 3, is comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, includes one or more devices used to transmit and receive data. A memory may be, for example, main memory 308, ROM 324, or a cache such as found in NB/MCH 302 in FIG. 3.

Those of ordinary skill in the art will appreciate that the hardware depicted in FIGS. 2 and 3 may vary depending on the implementation. Other internal hardware or peripheral devices, such as flash memory, equivalent non-volatile memory, or optical disk drives and the like, may be used in addition to or in place of the hardware depicted in FIGS. 2 and 3. Also, the processes of the illustrative embodiments may be applied to a multiprocessor data processing system, other than the SMP system mentioned previously, without departing from the spirit and scope of the present invention.

Moreover, the data processing system 300 may take the form of any of a number of different data processing systems including client computing devices, server computing devices, a tablet computer, laptop computer, telephone or other communication device, a personal digital assistant (PDA), or the like. In some illustrative examples, data processing system 300 may be a portable computing device that is configured with flash memory to provide non-volatile memory for storing operating system files and/or user-generated data, for example. Essentially, data processing system 300 may be any known or later developed data processing system without architectural limitation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
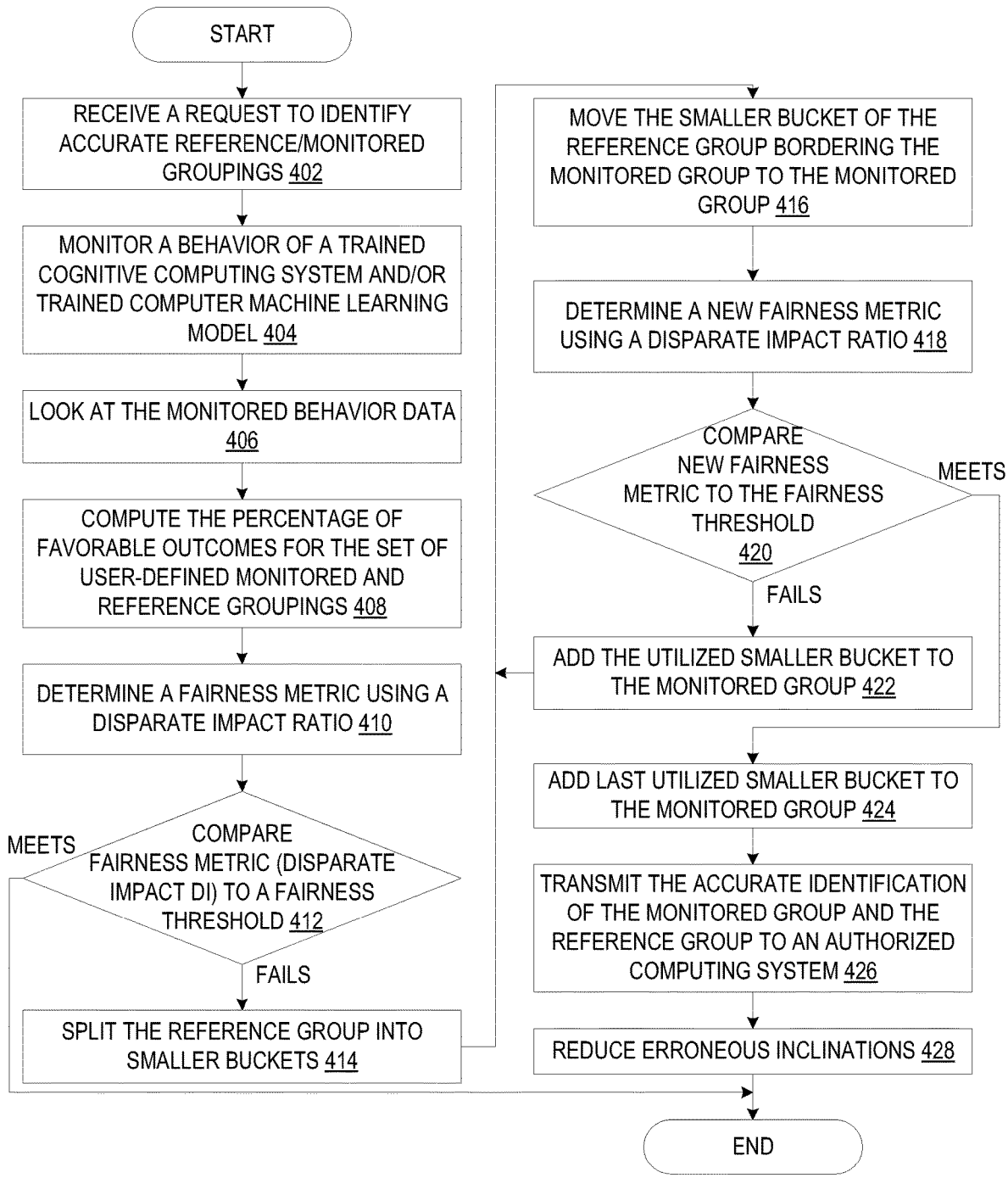
FIG. 4 is a flowchart outlining a first example of identifying accurate monitored and reference groups exhibited by a machine learning model and reducing erroneous inclinations of the machine learning model based on the identified accurate monitored and reference groups in accordance with one illustrative embodiment.

FIG. 4 is a flowchart outlining a first example of identifying accurate monitored and reference groups exhibited by a machine learning model and reducing erroneous inclinations of the machine learning model based on the identified accurate monitored and reference groups in accordance with one illustrative embodiment. As shown in FIG. 4, the operation starts by the machine learning model data quality improvement detection engine receiving a request to identify accurate reference/monitored groupings (step 402) which includes a set of user-defined monitored and reference groupings. The machine learning model data quality improvement detection engine then monitors a behavior of a trained cognitive computing system and/or trained computer machine learning model every predetermined time frame, such as 1, hour 2 hours, or the like (step 404).

Utilizing the identified set of user-defined monitored and reference groupings, the machine learning model data quality improvement detection engine looks at the monitored behavior data (step 406) and computes the percentage of favorable outcomes for the set of user-defined monitored and reference groupings (step 408). The machine learning model data quality improvement detection engine determines a fairness metric using a disparate impact ratio (step 410) and compares the fairness metric (disparate impact DI) to a fairness threshold (step 412). If at step 412 the machine learning model data quality improvement detection engine determines that the fairness metric meets the fairness threshold, the operation terminates. If at step 412 the machine learning model data quality improvement detection engine determines that the fairness metric fails to meet the fairness threshold, the machine learning model data quality improvement detection engine splits the reference group into smaller buckets (step 414).

The machine learning model data quality improvement detection engine then moves the smaller bucket of the reference group bordering the monitored group to the monitored group (step 416). The machine learning model data quality improvement detection engine determines a new fairness metric using a disparate impact ratio (step 418) and compares the fairness metric (disparate impact DI) to the fairness threshold (step 420). If at step 420 the machine learning model data quality improvement detection engine determines that the newly calculated fairness metric fails to meet the fairness threshold, then the machine learning model data quality improvement detection engine adds the utilized smaller bucket to the monitored group (step 422) with the process returning to step 416 to process the next smaller bucket. If at step 420 the machine learning model data quality improvement detection engine determines that the fairness threshold is met, the machine learning model data quality improvement detection engine adds the last analyzed smaller bucket to the monitored group (step 424), thereby identifying a new monitored group and new reference group.

Having identified the new monitored group and new reference group, the machine learning model data quality improvement detection engine transmits the accurate identification of the monitored group and the reference group to an authorized computing system (step 426). In response to receiving the accurate identification of the monitored group and the reference group, the machine learning model data quality improvement detection engine reduces erroneous inclinations of the trained cognitive computing system and/or trained computer machine learning model to address the newly identified the accurate identification of the monitored group and the reference group (step 428). That is, utilizing the newly identified ranges for the monitored and reference groups, the machine learning model data quality improvement detection engine may initiate a retraining of the trained cognitive computing system and/or the trained computer machine learning model via a machine learning training engine utilizing data that more accurate reflects the set of user-defined monitored and reference groupings or another set of monitored and reference groupings based on the needs of the client. The operation terminates thereafter.

FIG. 5 is a flowchart outlining a second example of identifying accurate monitored and reference groups exhibited by a machine learning model and reducing erroneous inclinations of the machine learning model based on the identified accurate monitored and reference groups in accordance with one illustrative embodiment. As shown in FIG. 5, the operation starts by the machine learning model data quality improvement detection engine receiving a request to identify accurate reference/monitored groupings (step 502) which includes a set of user-defined monitored and reference groupings. The machine learning model data quality improvement detection engine then monitors a behavior of a trained cognitive computing system and/or trained computer machine learning model every predetermined time frame, such as 1, hour 2 hours, or the like (step 504).

Utilizing the identified set of user-defined monitored and reference groupings, the machine learning model data quality improvement detection engine looks at the monitored behavior data (step 506) and computes the percentage of favorable outcomes for the set of user-defined monitored and reference groupings (step 508). The machine learning model data quality improvement detection engine determines a fairness metric using a disparate impact ratio (step 510) and compares the fairness metric (disparate impact DI) to a fairness threshold (step 512). If at step 512 the machine learning model data quality improvement detection engine determines that the fairness metric meets the fairness threshold, the operation terminates. If at step 512 the machine learning model data quality improvement detection engine determines that the fairness metric fails to meet the fairness threshold, the machine learning model data quality improvement detection engine identifies the boundaries of the reference group (step 514). Continuing with the example, the boundaries of the reference group would be 26 and 80. The machine learning model data quality improvement detection engine then divides the reference group into buckets (step 516) where the bucket size is for example, 10% of the size of reference thus, the buckets would be: (80−26)/10=5.4 which would be rounded off to 5. So the first bucket that the machine learning model data quality improvement detection engine would consider would be 26-30. That is, the machine learning model data quality improvement detection engine considers that there is an additional monitored group of 26-30 and the reference group will be 31-80.

For the new monitored group of 26-30, the machine learning model data quality improvement detection engine uses data perturbation. Data perturbation is a data security technique that adds 'noise' to databases allowing individual record confidentiality. This technique allows users to ascertain key summary information about the data that is not distorted and does not lead to a security breach. Therefore, for all the records received in the last predetermined time frame, if the data value is greater than the new monitored group, the machine learning model data quality improvement detection engine changes the data value to a value in the new monitored group and keeps all the other features constant (step 518). Similarly, for a record where the data value is less than or equal to the maximum data value in the new monitored group, the machine learning model data quality improvement detection engine changes the data value to greater than the maximum data value in the new monitored group and keeps all the other features constant (step 520). The machine learning model data quality improvement detection engine sends the new (changed) records to the trained cognitive computing system and/or trained computer machine learning model to determine how the trained cognitive computing system and/or trained computer machine learning model handles the changed records (step 522).

The machine learning model data quality improvement detection engine then determines a fairness metric using a disparate impact ratio based on the original record data and the newly considered perturbed record data (step 524). The machine learning model data quality improvement detection engine determines whether a predetermined number of iterations have been met (step 526). If at step 526 the predetermined number of iterations has not been met, then the machine learning model data quality improvement detection engine compares the fairness metric (disparate impact DI) to a fairness threshold to determine whether the trained cognitive computing system and/or trained computer machine learning model is truly acting in an erroneous manner (step 528). If at step 528 the machine learning model data quality improvement detection engine determines that the fairness metric meets the fairness threshold indicating that the trained cognitive computing system and/or trained computer machine learning model is not acting in an erroneous manner, then the machine learning model data quality improvement detection engine splits the new monitored group into half (step 530) with the operation returning to step 518 thereafter, e.g., the machine learning model data quality improvement detection engine considers group of 26-28 as the new monitored group. If, on the other hand, at step 528 the newly determined fairness metric fails to meet the fairness threshold, indicating that the trained cognitive computing system and/or trained computer machine learning model is acting in an erroneous manner, the machine learning model data quality improvement detection engine considers the next group, e.g. 31-35, as a new monitored group (step 532), with the operation returning to step 518 thereafter.

If at step 526 the predetermined number of iterations has not been met, then the machine learning model data quality improvement detection engine, then the machine learning model data quality improvement detection engine transmits a new monitored group range of the original monitored group plus any new monitored group(s) and the modified reference group minus the new monitored group(s) may be transmitted to an authorized computing system (step 534). In response to receiving the accurate identification of the monitored group and the reference group, the machine learning model data quality improvement detection reduces erroneous inclination of the trained cognitive computing system and/or trained computer machine learning model to address the newly identified the accurate identification of the monitored group and the reference group (step 536). That is, utilizing the newly identified ranges for the monitored and reference groups, the machine learning model data quality improvement detection engine may initiate a retraining of the trained cognitive computing system and/or the trained computer machine learning model via a machine learning training engine utilizing data that more accurate reflects the set of user-defined monitored and reference groupings or another set of monitored and reference groupings based on the needs of the client. The operation terminates thereafter.

It should be appreciated that while the above illustrative embodiments are described with regard to a cognitive computing system implementing or employing a question answering system and pipeline in which one or more computer models are utilized, the present invention is not limited to such. This is only one possible implementation of the mechanisms of the illustrative embodiment. The mechanisms of the illustrative embodiments may be utilized with any trained cognitive computing system and/or trained computer model in which the training may be erroneously inclined due to the training process and/or the data upon which the training is performed, or due to the corpus of data used by the trained cognitive computing system and/or trained computer model to perform its cognitive computing operations. For example, in some illustrative embodiments, the cognitive computing system and/or computer model may run analysis of unstructured text in a batch manner, not in a question/answer form, for example.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and memory, the memory comprising instructions executed by the processor to cause the processor to implement a machine learning model data quality improvement detection tool that identifies an accurate reference group and an accurate monitored group of a machine learning model, the method comprising:

monitoring, by the machine learning model data quality improvement detection tool, a behavior of the machine learning model for a predetermined time frame;

comparing, by the machine learning model data quality improvement detection tool, a determined fairness metric that utilizes a percentage of favorable outcomes of a user-defined monitored group and a percentage of favorable outcomes of a user-defined reference group to a pre-defined fairness threshold;

responsive to the determined fairness metric failing to meet the pre-defined fairness threshold, modifying, by the machine learning model data quality improvement detection tool, the user-defined monitored group to include a first portion of the user-defined reference group thereby forming a modified monitored group and a modified reference group;

comparing, by the machine learning model data quality improvement detection tool, a newly determined fairness metric that utilizes a percentage of favorable outcomes of the modified monitored group and a percentage of favorable outcomes of the modified reference group to the pre-defined fairness threshold; and responsive to the newly determined fairness metric meeting the pre-defined fairness threshold, identifying, by the machine learning model data quality improvement detection tool, the modified monitored group including the first portion of the user-defined reference group as a new monitored group and the modified reference group without the first portion of the user-defined reference group as a new reference group.

2. The method of claim 1, wherein the machine learning model data quality improvement detection tool modifies the user-defined monitored group to include portions of the user-defined reference group by:

splitting, by the machine learning model data quality improvement detection tool, the user-defined reference group into a set of smaller reference groups; and moving, by the machine learning model data quality improvement detection tool, a smaller reference group of the set of smaller reference groups bordering the user-defined monitored group to the user-defined monitored group.

3. The method of claim 1, further comprising:

responsive to the newly determined fairness metric failing to meet the pre-defined fairness threshold, adding, the first portion of the user-defined reference group to the user-defined monitored group;

modifying, by the machine learning model data quality improvement detection tool, the user-defined monitored group to include a second portion of the user-defined reference group;

comparing, by the machine learning model data quality improvement detection tool, a further determined fairness metric that utilizes the percentage of favorable outcomes of the modified monitored group and the percentage of favorable outcomes of the modified reference group to the pre-defined fairness threshold; and responsive to the further determined fairness metric meeting the pre-defined fairness threshold, identifying, by the machine learning model data quality improvement detection tool, the modified monitored group including the first portion and the second portion of the user-defined reference group as the new monitored group and the modified reference group without the first portion and the second portion of the user-defined reference group as the new reference group.

4. The method of claim 1, wherein the machine learning model data quality improvement detection tool modifies the user-defined monitored group to include portions of the user-defined reference group by:

identifying, by the machine learning model data quality improvement detection tool, boundaries of the user-defined reference group;

dividing, by the machine learning model data quality improvement detection tool, the user-defined reference group into a set of sub-groups; and performing, by the machine learning model data quality improvement detection tool, data perturbation to move at least one record of a first sub-group in the set of sub-groups to a second sub-group in the set of sub-groups and to move at least one record of the second sub-group in the set of sub-groups to the first sub-group in the set of sub-groups.

5. The method of claim 4, further comprising:

splitting, by the machine learning model data quality improvement detection tool, the first sub-group further responsive to determining that the newly determined fairness metric meets the pre-defined fairness threshold indicating that the machine learning model is not acting in an erroneous manner.

6. The method of claim 4, further comprising:

performing, by the machine learning model data quality improvement detection tool, data perturbation to move at least one record of a third sub-group in the set of sub-groups to the second sub-group in the set of sub-groups and to move the at least one record of the second sub-group in the set of sub-groups to the first sub-group in the set of sub-groups.

7. The method of claim 1, further comprising:

executing, by the machine learning model data quality improvement detection tool, a machine learning operation on the machine learning model to retrain the machine learning model utilizing data that more accurately reflects the user-defined monitored group and the user-defined reference group.

8. The method of claim 1, further comprising:

executing, by the machine learning model data quality improvement detection tool, a machine learning operation on the machine learning model to retrain the machine learning model utilizing data for another monitored group and another reference group as a training dataset for the machine learning operation based on needs of a client.

9. A computer program product comprising a computer readable storage medium having a computer readable program stored therein, wherein the computer readable program, when executed on a computing device, causes the computing device to implement a machine learning model data quality improvement detection tool that identifies an accurate reference group and an accurate monitored group of a machine learning model, and to:

monitor, by the machine learning model data quality improvement detection tool, a behavior of the machine learning model for a predetermined time frame;

compare, by the machine learning model data quality improvement detection tool, a determined fairness metric that utilizes a percentage of favorable outcomes of a user-defined monitored group and a percentage of favorable outcomes of a user-defined reference group to a pre-defined fairness threshold;

responsive to the determined fairness metric failing to meet the pre-defined fairness threshold, modify, by the machine learning model data quality improvement detection tool, the user-defined monitored group to include a first portion of the user-defined reference group thereby forming a modified monitored group and a modified reference group;

compare, by the machine learning model data quality improvement detection tool, a newly determined fairness metric that utilizes a percentage of favorable outcomes of the modified monitored group and a percentage of favorable outcomes of the modified reference group to the pre-defined fairness threshold; and responsive to the newly determined fairness metric meeting the pre-defined fairness threshold, identify, by the machine learning model data quality improvement detection tool, the modified monitored group including the first portion of the user-defined reference group as a new monitored group and the modified reference group without the first portion of the user-defined reference group as a new reference group.

10. The computer program product of claim 9, wherein the machine learning model data quality improvement detection tool modifies the user-defined monitored group to include portions of the user-defined reference group by:
   splitting, by the machine learning model data quality improvement detection tool, the user-defined reference group into a set of smaller reference groups; and
   moving, by the machine learning model data quality improvement detection tool, a smaller reference group of the set of smaller reference groups bordering the user-defined monitored group to the user-defined monitored group.

11. The computer program product of claim 9, wherein the computer readable program further causes the computing device to:
   responsive to the newly determined fairness metric failing to meet the pre-defined fairness threshold, add the first portion of the user-defined reference group to the user-defined monitored group;
   modify, by the machine learning model data quality improvement detection tool, the user-defined monitored group to include a second portion of the user-defined reference group;
   compare, by the machine learning model data quality improvement detection tool, a further determined fairness metric that utilizes the percentage of favorable outcomes of the modified monitored group and the percentage of favorable outcomes of the modified reference group to the pre-defined fairness threshold; and
   responsive to the further determined fairness metric meeting the pre-defined fairness threshold, identify, by the machine learning model data quality improvement detection tool, the modified monitored group including the first portion and the second portion of the user-defined reference group as the new monitored group and the modified reference group without the first portion and the second portion of the user-defined reference group as the new reference group.

12. The computer program product of claim 9, wherein the machine learning model data quality improvement detection tool modifies the user-defined monitored group to include portions of the user-defined reference group by:
   identifying, by the machine learning model data quality improvement detection tool, boundaries of the user-defined reference group;
   dividing, by the machine learning model data quality improvement detection tool, the user-defined reference group into a set of sub-groups; and
   performing, by the machine learning model data quality improvement detection tool, data perturbation to move at least one record of a first sub-group in the set of sub-groups to a second sub-group in the set of sub-groups and to move at least one record of the second sub-group in the set of sub-groups to the first sub-group in the set of sub-groups.

13. The computer program product of claim 12, wherein the computer readable program further causes the computing device to:
   split, by the machine learning model data quality improvement detection tool, the first sub-group further responsive to determining that the newly determined fairness metric meets the pre-defined fairness threshold indicating that the machine learning model is not acting in an erroneous manner.

14. The computer program product of claim 12, wherein the computer readable program further causes the computing device to:
   perform, by the machine learning model data quality improvement detection tool, data perturbation to move at least one record of a third sub-group in the set of sub-groups to the second sub-group in the set of sub-groups and to move the at least one record of the second sub-group in the set of sub-groups to the first sub-group in the set of sub-groups.

15. The computer program product of claim 9, wherein the computer readable program further causes the computing device to:
   execute, by the machine learning model data quality improvement detection tool, a machine learning operation on the machine learning model to retrain the machine learning model utilizing data that more accurately reflects the user-defined monitored group and the user-defined reference group.

16. The computer program product of claim 9, wherein the computer readable program further causes the computing device to:
   execute, by the machine learning model data quality improvement detection tool, a machine learning operation on the machine learning model to retrain the machine learning model utilizing data for another monitored group and another reference group as a training dataset for the machine learning operation based on needs of a client.

17. An apparatus comprising:
   a processor; and
   a memory coupled to the processor, wherein the memory comprises instructions which, when executed by the processor, cause the processor to implement a machine learning model data quality improvement detection tool that identifies an accurate reference group and an accurate monitored group of a machine learning model, and to:
   monitor, by the machine learning model data quality improvement detection tool, a behavior of the machine learning model for a predetermined time frame;
   compare, by the machine learning model data quality improvement detection tool, a determined fairness metric that utilizes a percentage of favorable outcomes of a user-defined monitored group and a percentage of favorable outcomes of a user-defined reference group to a pre-defined fairness threshold;
   responsive to the determined fairness metric failing to meet the pre-defined fairness threshold, modify, by the machine learning model data quality improvement detection tool, the user-defined monitored group to include a first portion of the user-defined reference group thereby forming a modified monitored group and a modified reference group;
   compare, by the machine learning model data quality improvement detection tool, a newly determined fairness metric that utilizes a percentage of favorable outcomes of the modified monitored group and a percentage of favorable outcomes of the modified reference group to the pre-defined fairness threshold; and
   responsive to the newly determined fairness metric meeting the pre-defined fairness threshold, identify, by the machine learning model data quality improvement detection tool, the modified monitored group including the first portion of the user-defined reference group as a new monitored group and the modified reference group without the first portion of the user-defined reference group as a new reference group.

18. The apparatus of claim 17, wherein the machine learning model data quality improvement detection tool modifies the user-defined monitored group to include portions of the user-defined reference group by:
   splitting, by the machine learning model data quality improvement detection tool, the user-defined reference group into a set of smaller reference groups; and
   moving, by the machine learning model data quality improvement detection tool, a smaller reference group of the set of smaller reference groups bordering the user-defined monitored group to the user-defined monitored group.

19. The apparatus of claim 17, wherein the instructions further cause the processor to: responsive to the newly determined fairness metric failing to meet the pre-defined fairness threshold, add the first portion of the user-defined reference group to the user-defined monitored group;
   modify, by the machine learning model data quality improvement detection tool, the
   user-defined monitored group to include a second portion of the user-defined reference group;
   compare, by the machine learning model data quality improvement detection tool, a further determined fairness metric that utilizes the percentage of favorable outcomes of the modified monitored group and the percentage of favorable outcomes of the modified reference group to the pre-defined fairness threshold; and
   responsive to the further determined fairness metric meeting the pre-defined fairness threshold, identify, by the machine learning model data quality improvement detection tool, the modified monitored group including the first portion and the second portion of the user-defined reference group as the new monitored group and the modified reference group without the first portion and the second portion of the user-defined reference group as the new reference group.

20. The apparatus of claim 17, wherein the machine learning model data quality improvement detection tool modifies the user-defined monitored group to include portions of the user-defined reference group by:
   identifying, by the machine learning model data quality improvement detection tool, boundaries of the user-defined reference group;
   dividing, by the machine learning model data quality improvement detection tool, the user-defined reference group into a set of sub-groups; and
   performing, by the machine learning model data quality improvement detection tool, data perturbation to move at least one record of a first sub-group in the set of sub-groups to a second sub-group in the set of sub-groups and to move at least one record of the second sub-group in the set of sub-groups to the first sub-group in the set of sub-groups.

* * * * *